United States Patent

Good et al.

(10) Patent No.: US 7,565,254 B2
(45) Date of Patent: Jul. 21, 2009

(54) METHOD AND APPARATUS FOR METROLOGY SAMPLING USING COMBINATION SAMPLING RULES

(75) Inventors: Richard P. Good, Austin, TX (US); James Broc Stirton, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 49 days.

(21) Appl. No.: 11/609,959

(22) Filed: Dec. 13, 2006

(65) Prior Publication Data

US 2008/0147343 A1 Jun. 19, 2008

(51) Int. Cl.
*G01N 37/00* (2006.01)
(52) U.S. Cl. ........................................ 702/83
(58) Field of Classification Search ............ 702/83
See application file for complete search history.

(56) References Cited

U.S. PATENT DOCUMENTS 7,460,968 B1 * 12/2008 Good et al. ............ 702/83
2004/0236528 A1 * 11/2004 Steinkirchner et al. ...... 702/83
2005/0033467 A1 * 2/2005 Purdy ....................... 700/109

* cited by examiner

*Primary Examiner*—Bryan Bui
*Assistant Examiner*—Jonathan Teixeira Moffat
(74) *Attorney, Agent, or Firm*—Williams, Morgan & Amerson, P.C.

(57) ABSTRACT

A method includes defining a plurality of simple sampling rules for selecting material for metrology. Each simple sampling rule has an associated penalty. At least one combination sampling rule relating a subset of at least two simple sampling rules is defined. The combination sampling rule has an associated penalty. The penalties are assessed responsive to a previous material selection not satisfying the simple sampling rules or the combination sampling rule. Material is selected for subsequent metrology based on the sampling rules and the assessed penalties. At least one characteristic of the selected material is measured.

26 Claims, 2 Drawing Sheets

METHOD AND APPARATUS FOR METROLOGY SAMPLING USING COMBINATION SAMPLING RULES

CROSS-REFERENCE TO RELATED APPLICATIONS

Not applicable.

BACKGROUND OF THE INVENTION

The present invention relates generally to manufacturing and, more particularly, to a method and apparatus for metrology sampling using combination sampling rules.

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe so that a desired product is formed in or on the wafer. For example, a photolithography stepper may be used to form a patterned layer of photoresist above the wafer. Features in the patterned layer of photoresist correspond to a plurality of features (e.g., gate electrode structures) that will ultimately be formed above the surface of the wafer. When processing of the wafer is complete, the various features formed in or on the wafer, as well as features formed in or on layers that are deposited above the wafer, combine to form the desired product. Exemplary products include processors, memory elements, and the like.

The semiconductor fabrication facility typically also includes metrology tools for collecting data indicative of the physical state of one or more wafers before, during, and/or after processing by the processing tools. Collecting the data indicative of the physical state of a wafer using a metrology tool is conventionally referred to as "sampling" the wafer. Data collected by the metrology tools may be used to characterize the wafer, to detect faults associated with the processing, and/or to determine (or predict) the quality of the finished product. For example, a mean critical dimension associated with the various features (e.g., gate electrode structures) may be indicative of a performance level of products formed on the wafer and/or the wafer lot. If the wafer state data indicates that the mean critical dimension associated with the feature (e.g., a gate electrode) is on the lower end of an allowable range for such feature sizes, then this may indicate that the product formed on the wafer may exhibit relatively high performance levels. For example, smaller feature sizes in a processor formed on the wafer may be associated with faster processing speeds. Higher performance products may be sold at a higher price, thereby increasing the profitability of the manufacturing operation.

High-volume semiconductor fabrication facilities may process hundreds or even thousands of wafer lots every week. Sampling every processed wafer (or wafer lot) may significantly reduce the efficiency of the semiconductor fabrication facility, at least in part because metrology generally takes longer than processing. Accordingly, only a portion of the wafers processed in the facility are typically sampled. For example, a wafer lot including 25 wafers may be processed using a three-chamber etching tool. To monitor the operation of each chamber of the etching tool, an engineer may select particular wafers in a run to be sampled by a metrology tool and include these selections in a sampling plan. If the wafers are provided to the chambers of the etching tool sequentially, one possible sampling plan could be to perform metrology on the first wafer, which should be provided to the first chamber, on the 11th wafer, which should be provided to the second chamber, and on the 24th wafer, which should be provided to the third chamber.

Moreover, it is not feasible to sample each die location on a selected wafer. It is known that certain characteristics vary across the wafer due to non-uniform processing. For example, the results obtained by performing processing operations in an etch tool or chemical mechanical planarization (CMP) tool may vary radially, such that the process rate is greater nearer the center of the wafer or nearer the periphery of the wafer. Hence, a plurality of sites in different locations on the wafer is selected for sampling. Typically, the locations of these selected sites are fixed. Depending on the degree of oversight required for the product, the number of fixed sites may vary. For instance, 5, 9, or 17 sites may be sampled on a wafer.

Static sampling plans, such as the one described above, are appropriate as long as the manufacturing environment in the semiconductor fabrication facility is also static. With respect to site-level sampling, the predetermined site locations provide a fixed view of wafer uniformity. Uniformity variations in directions not addressed by the predetermined sample sites are not apparent from the collected metrology data.

Often in choosing which wafers to sample, the choice of wafers (i.e., or lots or sites) is contingent on the satisfaction of other sampling rules. For example, if it is desired to estimate the bias between two chambers of a process tool then it is necessary to measure at least one wafer from each chamber. The measurement of each chamber may be represented by independent wafer sampling rules. However, if one chamber is measured, while the other chamber is not measured, then it is impossible to calculate the bias. In this case, the sampling resources would be better spent measuring other wafers. Individual sampling rules do not consider or react to contingencies with respect to the relationships between the wafers, lots, or sites selected. In another example, rules may be related in such a way that if one rule is satisfied, satisfaction the other rule is not necessary or desired. Individual sampling rules do not factor in these types of relationships.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for metrology sampling. The method includes defining a plurality of simple sampling rules for selecting material for metrology. Each simple sampling rule has an associated penalty. At least one combination sampling rule relating a subset of at least two simple sampling rules is defined. The combination sampling rule has an associated penalty. The penalties are assessed responsive to a previous material selection not satisfying the simple sampling rules or the combination sampling rule. Material is selected for subsequent metrology based on the sampling rules and the assessed penalties. At least one characteristic of the selected material is measured.

Another aspect of the present invention is seen in a system including means for defining a plurality of simple sampling rules for selecting material for metrology, each simple sampling rule having an associated penalty, means for defining at least one combination sampling rule relating a subset of at least two simple sampling rules, the combination sampling rule having an associated penalty, means for assessing the penalties responsive to a previous material selection not satisfying the simple sampling rules or the combination sampling rule, means for selecting material for subsequent metrology based on the sampling rules and the assessed penalties, and means for outputting a sampling plan indicating the selected material.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
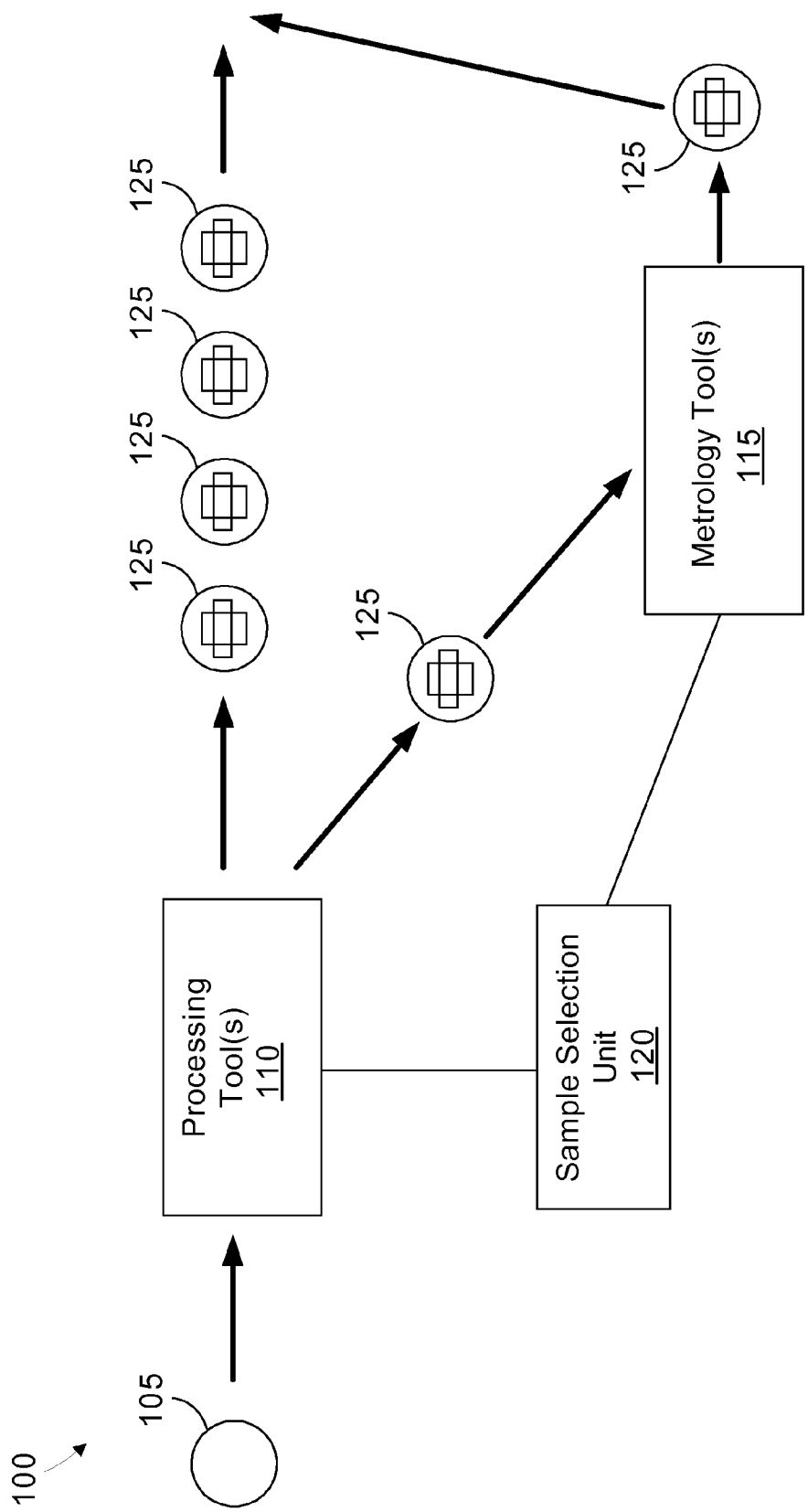
FIG. 1 is a simplified block diagram of an illustrative manufacturing system in accordance with one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CDROM"), and may be read only or random access. Similarly, the transmission medium may be twisted wire pairs, coaxial cable, optical fiber, or some other suitable transmission medium known to the art. The invention is not limited by these aspects of any given implementation.

Referring now to the drawings wherein like reference numbers correspond to similar components throughout the several views and, specifically, referring to FIG. 1, the present invention shall be described in the context of an illustrative manufacturing system 100. Although the invention is described as it may be implemented in a semiconductor fabrication facility, the invention is not limited to implementation in a semiconductor fabrication facility and may be applied to other manufacturing environments. In the illustrated embodiment, the manufacturing system 100 is configured to fabricate semiconductor devices in or on one or more wafer lots 105. The particular type of semiconductor devices, or products, formed in or on the wafers in the wafer lot 105 are not material to the present invention and, in various embodiments, may include any type of product. In various alternative embodiments, the techniques described herein may be applied to a variety of workpieces or manufactured items to form products including, but not limited to, microprocessors, memory devices, digital signal processors, application specific integrated circuits (ASICs), or other similar devices. The techniques may also be applied to workpieces or manufactured items other than semiconductor devices. Persons of ordinary skill in the art having benefit of the present disclosure should appreciate that, in various embodiments, the wafer lots 105 may represent individual wafers, multiple wafers, one or more wafer lots, or any other number and/or grouping of wafers.

The manufacturing system 100 includes one or more processing tools 110 that may be used to form one or more products, or portions thereof, in or on the wafers in the wafer lots 105. In the illustrated embodiment, the processing tools 110 are depicted as a single entity. However, persons of ordinary skill in the art should appreciate that the processing tools 110 may be implemented in any number of entities. Moreover, in various alternative embodiments, the manufacturing system 100 may include any number of processing tools 110 of any type, including lithography tools, deposition tools, etching tools, polishing tools, annealing tools, and the like. In the illustrated embodiment, the manufacturing system 100 also includes one or more metrology tools 115, which may be integrated or standalone metrology tools 115. For example, the manufacturing system 100 may include metrology tools 115 such as scatterometers, ellipsometers, scanning electron microscopes, and the like. Techniques for operating the processing tools 110 and metrology tools 115 are known in the art and, in the interest of clarity, only those aspects of the operation of these devices that are relevant to the present invention will be discussed further herein.

A sample selection unit 120 is communicatively coupled to the processing tools 110 and the metrology tools 115. In the interest of clarity, the individual connections between the sample selection unit 120 and the processing tools 110, as well as the connections between the sample selection unit 120 and the metrology tools 115, are each depicted using a single line in FIG. 1. However, persons of ordinary skill in the art should appreciate that numerous interconnections may be used to communicatively couple the sample selection unit 120 to the processing tools 110 and/or the metrology tools 115. Persons of ordinary skill in the art are able to configure the manufacturing system 100 to provide the required interconnections to establish a communicative coupling between the sample selection unit 120, the processing tools 110, and the metrology tools 115. In various alternative embodiments, the sample selection unit 120 may be implemented in a computing device such as a desktop computer, a laptop computer, and the like. However, persons of ordinary skill in the art should appreciate that, in alternative embodiments, portions of the sample selection unit 120 may be implemented in any number of devices and/or locations.

In operation, the processing tools 110 process one or more of the wafers in the wafer lot 105 to form one or more processed wafers 125. For example, the processing tools 110 may be used to form one or more features (e.g., a gate electrode) and/or one or more devices (e.g., a microprocessor and/or a memory element) in or on the wafers in the wafer lot 105 to produce the processed wafers 125.

The sample selection unit 120 may select one or more of the processed wafers 125 or sites on selected wafers 125 for sampling by the metrology tools 115. Techniques for selecting particular wafers are described in U.S. patent application Ser. No. 11/239,814, entitled "METHOD AND APPARATUS FOR SELECTING WAFERS FOR SAMPLING," and techniques for selecting particular sites are described in U.S. patent application Ser. No. 11/539,800, entitled "METHOD AND APPARATUS FOR SELECTING SITES FOR SAMPLING," both of which are incorporated herein by reference in their entireties. These techniques employ single sampling rules.

In the illustrated embodiment, the sample selection unit 120 selects particular wafers, lots, or sites based on one or more sampling rules associated with the sampling process. The sample selection unit 120 employs "simple" sampling rules, as described in the above-referenced patent applications. In addition, the sample selection unit 120 employs higher level, "combination" rules that define additional rules based on combinations of the lower level simple rules. Like the simple rules, the combination rules also have associated penalties and jeopardy states, as described in greater detail below.

Exemplary wafer/lot simple sampling rules include, but are not limited to, sampling rules associated with a wafer sequence (e.g., every third processed wafer, at least one even numbered wafer, at least one odd numbered wafer, at least two of the first four wafers, at least two of the last four wafers, at most four wafers, etc.), a processing sequence (e.g., a wafer that has been processed by each of the processing tools), and a metrology sequence (e.g., wafers should be evenly distributed to each of the metrology tools). Exemplary simple site sampling rules include, but are not limited to, sampling each potential site, sampling less than or equal to a predetermined number of sites, sampling each site combination to allow collection of site bias data, sampling sites at different radial positions, sampling sites measured in previous metrology events, etc.

Depending on the particular single sampling rules selected, it may not always be feasible to select a sample that satisfies all of the defined rules. Hence, penalties assigned to violations of the sampling rules are accrued to help ensure that each rule is satisfied (i.e., and the penalty reset) at some minimum frequency. Also, the sample selection unit 120 employs the combination rules to attempt to select the best wafers given a sampling rule set that can be infeasible.

In implementing the sampling rules, the sample selection unit 120 employs various matrix techniques to represent the sampling problem as a mixed integer linear problem (MILP). Software packages are publicly available for performing mixed integer linear optimization. For example, the Gnu linear programming kit (GLPK) is a publicly available, open-source software tool that may be used. Other techniques for solving the sampling problem include a brute force technique where all possible wafer/site selection combinations are evaluated and the combination having the lowest penalty score is selected or a next best iterative technique, where the site having the lowest score is selected, after which the scores for remaining sites are recalculated and the next best (i.e., the wafer/site having the lowest penalty after recalculation) is selected. The particular technique selected depends, at least in part, on the number of candidate wafer/sites, as this determines the computational complexity of the algorithm. The present invention should not be considered as limited to any of these illustrative techniques, and those of skill in the art will recognize, after reading the present disclosure, that a variety of other techniques may be employed as well.

For purposes of the following illustration, the operation of the sample selection unit 120 with respect to simple and combination sampling rules is described with respect to wafer/lot selection rules. However, the application of the present invention is not limited to such a sampling implementation, as the techniques may be applied to site selection rules or rules related to items or workpieces other than semiconductor devices. In the following discussion, the following exemplary simple sampling rules are employed.

1. Choose at least one odd wafer
2. Choose at least one even wafer
3. Choose at least two of the first four wafers
4. Choose at least two of the last four wafers
5. Choose at most two wafers The decision variable for the selection of a given wafer is represented as a column decision vector, X $$X=[0\ 1\ 1\ 0\ 0\ 0\ 0\ 0]^T.$$

The mapping of the wafers to the sampling rules is defined by a class matrix, C. Each column of the class matrix indicates the subgroup of wafers that belong to a single sampling rule. If Wafer i belongs to rule group j, then $C_{i,j}=1$, otherwise, $C_{i,j}=0$. Each column corresponds to a wafer sampling rule and the rows of the class matrix correspond to the wafers in the lot. For the exemplary rules listed above, the C matrix would be written $$C = \begin{bmatrix} 1 & 0 & 1 & 0 & 1 \\ 0 & 1 & 1 & 0 & 1 \\ 1 & 0 & 1 & 0 & 1 \\ 0 & 1 & 1 & 0 & 1 \\ 1 & 0 & 0 & 1 & 1 \\ 0 & 1 & 0 & 1 & 1 \\ 1 & 0 & 0 & 1 & 1 \\ 0 & 1 & 0 & 1 & 1 \end{bmatrix},$$

where the first column of C corresponds to the odd numbered wafers (Rule 1), the second column to the even wafers (Rule 2), etc. It follows that the total wafers belonging to each of the m rule groups is $C^T X$. If the second and third wafers are selected, then $$C^T X=[1\ 1\ 2\ 0\ 2]^T.$$

which indicates that one even, one odd, two of the first four, zero of the last 4, and 2 total wafers have been selected.

Next, a vector N is defined to indicate the total number of wafers desired for each of the constraint groups. If η wafers are desired for constraint group j, then $N_j=η$. If it is desired that no wafers are selected from constraint group j, then $N_j=0$. In the illustrated example $$N=[1\ 1\ 2\ 2\ 2]^T.$$

Although the N vector indicates the total number of wafers desired in each sampling rule, it says nothing of the nature of the rule. N is the same if a maximum of η wafers or a minimum of η wafers is desired. To indicate the comparative operator of the rule group, a diagonal matrix, Ψ, is used. If $N_j$ or more wafers are desired for rule group j, then $Ψ_{j,j}=1$. Conversely, if $N_j$ or fewer wafers are desired, then $Ψ_{j,j}=-1$. In the illustrated example, N represents the lower limit of wafer sampling for the first four rules and the upper limit on the fifth rule. It follows that $$Ψ=\text{diag}([1\ 1\ 1\ 1\ -1]^T).$$

Multiplying Ψ by the difference between N and $C^T X$ results in the number of wafers still required to satisfy a rule, D $$D=Ψ(C^T X-N). \tag{1}$$

If $D_j<0$ then rule j has not been met; either too few wafers have been selected from the rule group (when $Ψ_{j,j}=1$) or too many wafers have been selected for the rule group (when $Ψ_{j,j}=-1$). Conversely, if $D_j \geq 0$ then rule j has been satisfied. A penalty should be accrued only when $D_j$ is less than zero. In the illustrated example, selecting the second and third wafers gives $$D=[0\ 0\ 0\ -2\ 0]^T.$$

The value of $D_4=-2$ indicates that two wafers from the last four slots are still required. The other four rules have corresponding non-negative values indicating that the rules are satisfied. In the following discussion, two scenarios illustrating how the negative components of D are penalized are described.

A first method for penalizing a rule violation is to increase the penalty linearly with the size of the rule violation. To do this, an m×1 vector of penalties, P, corresponding to each of the sampling rules is defined. Rules deemed more critical for the particular implementation are assigned a larger penalty, while less critical rules are assigned a smaller penalty. Since the objective of the MILP solution is to minimize the sum of the penalties accrued by each of the sampling rules, an objective function can be written as $$\min_X J = \frac{1}{2} P^T (|D|-D). \tag{2}$$

where the quantity $$\frac{1}{2}(|D|-D)$$

is a vector consisting of the negative component of D. The non-linear objective function of Equation (2) can be rewritten as a linear objective function by separating the elements inside the absolute value into positive and negative components. By substituting $D=α^+-α^-$ (i.e., so that $|D|=α^++α^-$) the objective function (2) can be rewritten $$\min_X J = P^T α^- \tag{3}$$

where $$α^+ \geq 0,$$

$$α^- \geq 0,$$

and from Equation (1)

$$α^+-α^- -Ψ C^T X=-ΨN.$$

In the simplified objective function of Equation (3), when $D_j \geq 0$ then the rule has been satisfied and there is no penalty on the objective function. Accordingly, there is no $α^+$ term in the objective function. When $D_j<0$, on the other hand, then rule j has been violated by $α_j^-$ wafers, and the objective function accrues a penalty $J_j=P_j\alpha_j^-$. Thus, the objective function is a function only of the negative component of D.

To place Equation (3) in standard MILP format, a new decision variable, $\chi$ that includes the positive and negative components of D ($\alpha^+$ and $\alpha^-$) and the vector of wafer selections, X, is defined:

$$\chi=[\alpha^+ \; \alpha^- \; X]^T.$$

The objective function of Equation (3) can now be written $$\min_\chi J = f^T \chi \qquad (4)$$

$$f = \begin{bmatrix} 0_{m\times 1} \\ P \\ 0_{n\times 1} \end{bmatrix},$$

where and where $0_{a\times b}$ is a matrix containing all zeros of dimension a×b.

There are three types of constraints on the MILP: equality constraints, inequality constraints and integer (binary) constraints. The equality constraints result from the components of the absolute value as defined in Equation (3), $$[I_m \; -I_m \; \Psi C^T]\chi = -\Psi N \qquad (5)$$

where $I_m$ is the identity matrix of size m, and where m is the number of sampling rules. Likewise, the inequality constraints restrict the components of the absolute values to being non-negative, $$[I_{2m} \; 0_{2m\times n}]\chi \geq 0_{(2m+n)\times 1} \qquad (6)$$

The wafer selection vector, X, is constrained to be 0 or 1, $$X_i = 0 \text{ or } 1 \; \forall i=1\ldots n. \qquad (7)$$

In the illustrated example, a qualitative decision may be made that the rule limiting the number of wafers measured to two is more critical than the other four rules. As a result, the penalty for rule 5 is assigned a value of 2 while the other four rules are assigned a value of 1, $$P=[1\;1\;1\;1\;2]^T.$$

Using the GNU Linear Programming Kit to solve for the optimal selection returns wafers 3 and 8 as the optimal selection. As contemplated, the optimization algorithm was unable to satisfy all of the sampling rules. The choice to increase the penalty on the two wafer limit has allowed the algorithm to select one wafer from both the first four and the last four wafers. If the penalty on the two wafer limit is decreased to $P_5=0.5$, then the algorithm selects four wafers: 3, 4, 7, and 8. In this case two wafers are measured from both the first four and the last four wafers, but the two-wafer limit is violated.

The previous penalty illustration penalized the size of a rule violation, where the contribution to the objective function increases linearly with the size of the rule violation. This approach may be problematic when it is more beneficial to satisfy one rule completely than to partially satisfy multiple rules. The following discussion introduces a second class of penalties which penalize a rule group as a whole. If a rule is violated, then the objective function accrues a constant penalty regardless of the size of the violation. Otherwise, if the rule is satisfied, the contribution is zero. It follows that the contribution to the objective function for rule j, $J_j$, should be the sum of a constant term, $P_{0,j}$ and a second term penalizing the size of the constraint violation $P_{1,j}\times\alpha_j^-$, $$J_j = \begin{cases} P_{0,j} + P_{1,j}\alpha_j^- & \text{for } \alpha_j^- > 0 \\ 0 & \text{for } \alpha_j^- = 0 \end{cases}. \qquad (8)$$

The objective function in Equation (8) can be expressed as a piecewise linear function where $J(\alpha_j^-)=(P_{0,j}+P_{1,j})\alpha_j^-$ for $0 \leq \alpha_j^- \leq 1$ and $J(\alpha_j^-)=P_{0,j}+P_{1,j}\alpha_j^-$ for $1 \leq \alpha_j^- \leq n$. The terminal boundary point $\alpha_j^- = n$ is chosen because a constraint can never be violated by more than the total number of wafers, n.

There are two commonly used techniques for formulating piecewise linear objective functions as MILPs. The first method, called the complex combination formulation, uses the fact that $J(\alpha_j^-)$ can be expressed as a weighted average of two successive breakpoints. Applying this method to Equation (8) requires 2×m additional binary variables and 3×m additional continuous variables. The second method, called the incremental cost formulation, uses binary variables to update the cost function by adding a new linear segment at each breakpoint. This method is requires only m additional binary variables and 2×m additional continuous variables.

According to the incremental cost formulation, the objective function in Equation (8) can be posed as an MILP by first expressing $\alpha_j^-$ as a sum of the two regions, $$\alpha_j^- = y_{1,j} + y_{2,j},$$

where $0 \leq y_{1,j} \leq 1$ and $1 \leq y_{2,j} \leq n-1$, and if $\alpha_j^- < 1$ then $y_{2,j}=0$. To enforce this second constraint, a binary variable $z_j$ is introduced such that $$z_j \leq y_{1,j} \leq 1$$

$$0 \leq y_{2,j} \leq z_j(n-1).$$

When $\alpha_j^-$ is in the region $0 \leq \alpha_j^- \leq 1$ then $z_j$ and $y_{2,j}$ must be zero. Likewise, if $1 \leq \alpha_j^- \leq n-1$ then $z_j$ and $y_{2,j}$ must be one. The contribution to the objective function for rule j can then be expressed as:

$$J(\alpha_j^-)=(P_{0,j}+P_{1,j})y_{1,j}+P_{1,j}y_{2,j}. \qquad (9)$$

To express Equation (9) in standard MILP format, the decision variable is redefined as $$\chi=[\alpha^+ \; y_1 \; y_2 \; z \; X]^T$$

so that the objective function in Equation (9) can be expressed as per Equation (4) where f is $$f=[0_{m\times 1} \; P_0+P_1 \; P_1 \; 0_{(m+n)\times 1}]^T. \qquad (10)$$

The MILP formulation requires four types of inequality constraints in addition to equality constraints and integer (binary) constraints. The inequality constraints are listed below.

$$y_{1,j} \leq 1, \; \forall j=1\ldots m \; [0_{m\times m} \; I_m \; 0_{m\times(2m+n)}]\chi \leq 1_{m\times 1} \qquad (11)$$

$$y_{1,j} \geq z_j, \; \forall j=1\ldots m \; [0_{m\times m} \; I_m \; 0_{m\times m} \; -I_m \; 0_{m\times n}]\chi \geq 0_{m\times 1} \qquad (12)$$

$$y_{2,j} \geq (n-1)z_j, \; \forall j=1\ldots m \; [0_{m\times 2m} \; I_m \; -(n-1)I_m \; 0_{m\times n}]$$
$$\chi \geq 0_{m\times 1} \qquad (13)$$

$$\alpha^+, y_1, \text{ and } y_2 \text{ non-negative, } [I_{3m} \; 0_{3m\times(m+n)}]\chi \geq 0_{m\times 1} \qquad (14)$$

The equality constraints analogous to Equation (5) where $y_1+y_2$ is substituted for $\alpha^-$, $$[I_m \; -I_m \; -I_m \; 0_{m\times m} \; -\Psi C^T]\chi = -\Psi N. \qquad (15)$$

An additional constraint specifies that the elements in both the z and X vectors are either 0 or 1.

$$z_j = 0 \text{ or } 1 \; \forall j = 1 \ldots m$$

$$X_i = 0 \text{ or } 1 \; \forall i = 1 \ldots n. \tag{16}$$

In all, the MILP has 6×m inequality constraints, m equality constraints, and m+n binary constraints.

In the illustrated example, a decision has been made that it is more beneficial to measure either two wafers from the first four wafers or two wafers from the last four wafers than it is to measure one wafer from each. Therefore, instead of penalizing the size of the rule violation (as in the previous section), a penalty of 1 is assigned to rule groups 3 and 4 as a whole. The two classes of penalties are now, $$P_0 = [0\ 0\ 1\ 1\ 0]^T$$

$$P_1 = [1\ 1\ 0\ 0\ 2]^T.$$

Solving the MILP detailed in Equations (10) through (16) returns wafers 7 and 8 as the optimal selection. Here it is seen that by penalizing the rule group as a whole, the algorithm has satisfied rule 4 instead of partially satisfying rules 3 and 4. If the penalty on rule 3 is increased to $P_{0,3} = 2$ for the following wafer lot, then the algorithm selects wafers 3 and 4 (thus satisfying rule 3 and violating rule 4). By continuing this pattern of increasing the penalty on the unsatisfied rule, the algorithm alternates between choosing two wafers from the first four wafers and the last four wafers.

When $P_0$ is a vector of zeros then the methodology introduced in this section is identical to the method introduced in the previous section so that the method introduced here is a generalization of the previous section. However, by penalizing rule groups as a whole m additional integer variables and 3×m additional constraints are introduced. Therefore, if it is unnecessary to penalize rule groups as a whole then the simpler and less computationally expensive method may be used.

Instead of looking only at each simple rule individually, the sample selection unit 120 considers the satisfaction of groups of rules by using combination rules. For example, if it is desired to calculate the bias between wafers processed on a multi-chambered tool, then there is little benefit to selecting a wafer from a single chamber. Two or more rules must be satisfied simultaneously to achieve the objective of capturing the bias between chambers. For purposes of this illustration, consider an 8-wafer lot that has been processed on a four-chambered process tool. The metrology capacity is limited such that only two wafers per lot may be measured. For this scenario, the class matrix, C, would be written $$C = \begin{bmatrix} 1 & 0 & 0 & 0 & 1 \\ 0 & 1 & 0 & 0 & 1 \\ 0 & 0 & 1 & 0 & 1 \\ 0 & 0 & 0 & 1 & 1 \\ 1 & 0 & 0 & 0 & 1 \\ 0 & 1 & 0 & 0 & 1 \\ 0 & 0 & 1 & 0 & 1 \\ 0 & 0 & 0 & 1 & 1 \end{bmatrix},$$

where the first column corresponds to the first chamber, the second column to the second chamber, etc., and the final column corresponds to the limit of 2 sampled wafers. The $\Psi$ matrix and N vector are as follows, $$\Psi = \text{diag}([1\ 1\ 1\ 1\ -1]^T)$$

$$N = [1\ 1\ 1\ 1\ 2]^T.$$

Simply applying the simple rule algorithms introduced previously returns what appears to be a satisfactory result for the first run: one wafer from two different chambers are selected (e.g., chambers 1 and 2). For the following lot, the algorithm increases the penalties on the unselected chambers (e.g., chambers 3 and 4) so that these two chambers are selected. The algorithm would continue to flip-flop the chamber selections for all subsequent lots and, as a result, the biases between all of the chambers are never measured.

To measure all of the different biases, it is necessary to combine multiple columns of the C matrix into combination rules. To support this combination an m×l matrix, $\Pi$, is defined that maps columns of the C matrix to rule combinations or sub-groups in an analogous manner as the C matrix maps wafers to a rule group. In this case each column of $\Pi$ indicates which columns of C belong to rule sub-group k. If column j belongs to rule sub-group k, then $\Pi_{j,k} = 1$, otherwise $\Pi_{j,k} = 0$. Each column of $\Pi$ corresponds to a rule sub-group and each row of $\Pi$ corresponds to a column of the C matrix. To capture all of six possible chamber biases, the $\Pi$ matrix would be $$\Pi = \begin{bmatrix} 1 & 1 & 1 & 0 & 0 & 0 & 0 \\ 1 & 0 & 0 & 1 & 1 & 0 & 0 \\ 0 & 1 & 0 & 1 & 0 & 1 & 0 \\ 0 & 0 & 1 & 0 & 1 & 1 & 0 \\ 0 & 0 & 0 & 0 & 0 & 0 & 1 \end{bmatrix}.$$

The first six columns of $\Pi$ are the six possible chamber-bias combinations and the last column of $\Pi$ simply maps the fifth column of the C matrix onto itself.

The contribution to the objective function is expressed in terms of the size of the violation of a rule subgroup. A new decision variable, $\gamma^- = \Pi^T \alpha^-$, is defined so that the contributions to the objective function are analogous to Equation (8)

$$J_j = \begin{cases} P_{0,k} + P_{1,k} \gamma^- & \text{for } \gamma^- > 0 \\ 0 & \text{for } \gamma^- = 0 \end{cases} \tag{17}$$

where the l×1 penalty vectors, $P_0$ and $P_1$, penalize the rule subgroup as a whole and the size of the rule subgroup, respectively. This can be expressed as an MILP using the incremental cost formulation detailed above. Since the objective function is now a piecewise linear function of $\gamma^- = y_1 + y_2$, the decision variable is redefined $$\chi = [y_1\ y_2\ \alpha^+\ \alpha^-\ z\ X]^T$$

so that the objective function in Equation (9) can be expressed per Equation (4) where f is $$f = [P_0 + P_1\ P_1\ 0_{(l+3m+n) \times 1}]^T. \tag{18}$$

The inequality constraints for this MILP formulation are nearly identical to those listed in Equations (11) through (14) with the appropriate dimensions and with the additional constraint in Equation (14) that $\alpha_j^- \geq 0, \forall j = 1 \ldots m$. In addition to the equality constraint of Equation (15), the constraint is $\gamma^- = \Pi^T \alpha^-$ is added so that $$[I_l\ I_l\ 0_{l \times m}\ -\Pi^T\ 0_{l \times (l+n)}] \chi = 0_{l \times 1}.$$

The integer constraints are equivalent to Equation (16) with the appropriate dimensions.

Returning to the example, a qualitative decision is made that it is much more important to stay within the two-wafer limit than it is to capture any one bias between the chambers. In addition, partially satisfying a rule to capture the bias between two chambers provides no benefit. The penalty vectors embodying these priorities are $$P_0 = [1\ 1\ 1\ 1\ 1\ 1\ 0]^T$$

$$P_1 = [0\ 0\ 0\ 0\ 0\ 0\ 100]^T,$$

and the N vector and $\Psi$ matrix are $$N = [1\ 1\ 1\ 1\ 2]^T$$

$$\Psi = \text{diag}([1\ 1\ 1\ 1\ -1]^T).$$

Note that N and $\Psi$ correspond to the columns of the C matrix while $P_0$ and $P_1$ correspond to the columns of the $\Pi$ matrix.

Solving the MILP returns wafers 2 and 4 as the optimal selection. In this case, the bias between the first two chambers has been measured and the limit of two wafers has not been violated. For the following run the penalty on the violated states is increased such that $$P_0 = [1\ 2\ 2\ 2\ 2\ 2\ 0]^T$$

$$P_1 = [0\ 0\ 0\ 0\ 0\ 0\ 100]^T.$$

Reevaluating the MILP returns wafers 7 and 8 as the optimal selection so that the bias between the third and fourth chambers is measured. Again, the penalties are updated such that $$P_0 = [2\ 3\ 3\ 3\ 3\ 1\ 0]^T$$

$$P_1 = [0\ 0\ 0\ 0\ 0\ 0\ 100]^T.$$

The evaluation of the MILP then returns wafers 4 and 6, representing the bias between the second and fourth chambers. Although repeating this process does not guarantee that each bias is measured equally, it will guarantee that each bias is measured at a finite frequency.

It is worth noting here that if the $\Pi$ matrix is identity then the rule sub-groups are equivalent to the rule groups defined by the C matrix. It follows that the introduction of the $\Pi$ matrix is a generalization of the methods introduced above. The inclusion of subgroups adds l additional variables and a minimum of l+m additional constraints.

In the previous combination rule example, the choice of wafers is contingent on the satisfaction of other sampling rules. The simple sampling rules relate to sampling each chamber, and the combination sampling rules relate to measuring chamber biases through the combination of the single chamber measurements. If one chamber is measured while the other chamber is not measured then it is impossible to calculate the bias. In this case the sampling resources are better spent measuring other wafers.

A second example involves the sampling decision that one rule is not desired to be met if another rule or group of rules is satisfied. For instance, if two wafers are selected from a given chamber (rule 1) then it is not necessary to measure the wafers that were selected for measurement at a previous manufacturing step (rule 2). In this case the rules are combined such that if Rule 1 is satisfied then Rule 2 should not be satisfied. If both Rule 1 and Rule 2 are satisfied then the combination rule is considered in violation and a penalty is accrued in the objective function of the mixed-integer linear program.

Another example involves not satisfying a rule when another rule or group of rules are not satisfied. For example, if rules exists such that (Rule A) we wish to measure at most three wafers and (Rule B) that we wish to not measure the first three wafers then it can be specified that if Rule A is violated (we measure more than three wafers) then Rule B should also be violated (that is the first three wafers are measured). If more than three wafers are measured and the first three wafers are not measured then the combination rule is in violation and a penalty is accrued by the objective function.

Figure 2:
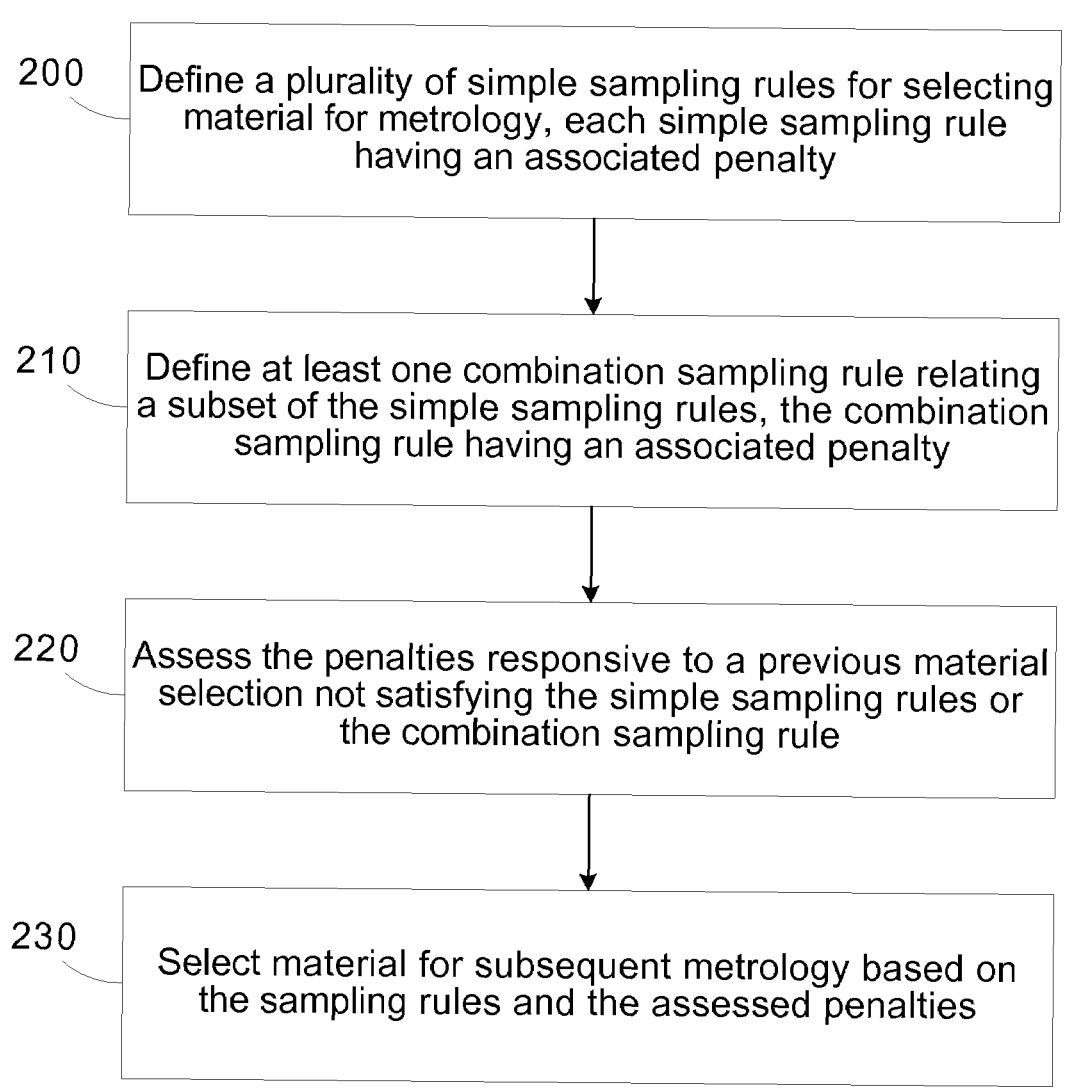
FIG. 2 is a simplified flow diagram of a method for metrology sampling in accordance with another embodiment of the present invention.

Turning now to FIG. 2, a simplified flow diagram of a method for selecting metrology samples in accordance with another illustrative embodiment of the present invention is provided. In method block 200, a plurality of simple sampling rules are defined for selecting material for metrology. Each simple sampling rule has an associated penalty. In method block 210, at least one combination sampling rule is defined relating a subset of the simple sampling rules. The combination sampling rule has an associated penalty. The penalties are assessed in method block 220 responsive to a previous material selection not satisfying the simple sampling rules or the combination sampling rule. In method block 230, material for subsequent metrology is selected based on the sampling rules and the assessed penalties. Following the selection of the material a sampling plan may be outputted and the metrology processed may be completed on the selected material to determine characteristics of the material.

The previous illustrations describe a methodology for selecting an optimal set of wafers from a batch of wafers given a set of wafer sampling rules. Since it is possible to over constrain the rule-set, it is possible that a solution which satisfies all of the sampling rules does not exist. To solve the infeasible case, penalties are assigned to each of the rule groups. The selection of wafers that minimizes the accrued penalties is considered the optimal selection of wafers.

The penalties on the wafer sampling rules were divided into two cases: penalties on the size of the rule violation and penalties on violating a rule as a whole. Although the latter is a generalization of the former, the solution to the latter is more computationally expensive and may not be necessary in all implementations. Persons of ordinary skill in the art having benefit of the present disclosure should appreciate that the penalties may be defined in a number of ways. The actual values of the penalties may vary; however, the effect of each penalty is determined by its value relative to the other penalties. The values (both absolute and relative) of the penalties are matters of design choice and not intended to limit the present invention.

The use of an MILP to solve the wafer sampling problem is an effective technique for resolving competing sampling rules. It can be difficult, however, to predict the steady state sampling rate given a group of rules and penalties or to choose penalties that achieve a desired steady state sampling rate. Trial and error with simulations may be necessary to choose an appropriate set of penalties. The examples provided herein have been chosen to demonstrate the algorithm and demonstrate only a small subset of the wide variety of sampling rules and patterns achievable by choosing appropriate C and $\Pi$ matrices and penalties.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method, comprising:
    defining for a processor a plurality of simple sampling rules for selecting material for metrology, each simple sampling rule having an associated penalty incurred in response to a non-selection of material meeting the rule;
    defining for the processor at least one combination sampling rule relating a subset of at least two simple sampling rules, the combination sampling rule having an associated penalty based on whether or not the material was selected for metrology according to each simple sampling rule in the subset;
    assessing using the processor, for a given material selection, the penalties responsive to the simple sampling rules and the combination sampling rule;
    selecting using the processor material for subsequent metrology based on the sampling rules and the assessed penalties; and
    measuring at least one characteristic of the selected material in at least one metrology tool.

2. The method of claim 1, wherein the penalties are assessed based on a size of a simple or combination sampling rule violation.

3. The method of claim 1, further comprising defining a plurality of combination sampling rules each relating a subset of the simple sampling rules and each combination sampling rule having an associated penalty.

4. The method of claim 1, further comprising:
    defining a class matrix associated with each of the simple sampling rules;
    defining a combination matrix associated with the combination sampling rule, the combination matrix defining the particular simple sampling rules included in the subset;
    defining a penalty matrix specifying the penalties associated with each of the simple sampling rules and the combination sampling rule; and
    selecting the material to optimize a value of the penalties associated with the selection.

5. The method of claim 4, further comprising defining a plurality of combination sampling rules each relating a subset of the simple sampling rules, wherein the penalty matrix includes penalties for each of the combination sampling rules.

6. The method of claim 4, wherein selecting the material to optimize the value of the penalties further comprises employing a mixed integer linear optimization.

7. The method of claim 4, wherein selecting the material to optimize the value of the penalties further comprises:
    generating a plurality of candidate material selection vectors;
    determining a penalty associated with each of the candidate material selection vectors; and
    selecting the candidate material selection vector having a minimum penalty value.

8. The method of claim 4, wherein selecting the material to optimize the value of the penalties further comprises employing a next best optimization technique to iteratively select material.

9. The method of claim 1, wherein the material comprises semiconductor wafers.

10. The method of claim 9, wherein the plurality of simple sampling rules are associated with selecting particular semiconductor wafers for metrology.

11. The method of claim 9, wherein the plurality of simple sampling rules are associated with selecting particular sites on the semiconductor wafers for metrology.

12. The method of claim 9, further comprising fabricating subsequent material using a process controlled at least in part based on the measured characteristic.

13. The method of claim 1, wherein the combination rule associates the satisfaction of a first simple sampling rule with the satisfaction of a second simple sampling rule.

14. The method of claim 1, wherein the combination rule associates the violation of a first simple sampling rule with the satisfaction of a second simple sampling rule.

15. The method of claim 1, wherein the combination rule associates the violation of a first simple sampling rule with the violation of a second simple sampling rule.

16. A method, comprising:
    defining for a processor a plurality of simple sampling rules for selecting material for metrology, each simple sampling rule having an associated penalty incurred in response to a non-selection of material meeting the rule;
    defining for the processor at least one combination sampling rule relating a subset of at least two simple sampling rules, the combination sampling rule having an associated penalty based on whether or not the material was selected for metrology according to each simple sampling rule in the subset;
    assessing using the processor, for a given material selection, the penalties responsive to the simple sampling rules and the combination sampling rule;
    selecting using the processor material for subsequent metrology based on the sampling rules and the assessed penalties; and
    outputting a sampling plan for at least one metrology tool indicating the selected material.

17. The method of claim 16, further comprising defining a plurality of combination sampling rules each relating a subset of the simple sampling rules and each combination sampling rule having an associated penalty.

18. The method of claim 16, further comprising:
    defining a class matrix associated with each of the simple sampling rules;
    defining a combination matrix associated with the combination sampling rule, the combination matrix defining the particular simple sampling rules included in the subset;
    defining a penalty matrix specifying the penalties associated with each of the simple sampling rules and the combination sampling rule; and
    selecting the material to optimize a value of the penalties associated with the selection.

19. The method of claim 18, further comprising defining a plurality of combination sampling rules each relating a subset of the simple sampling rules, wherein the penalty matrix includes penalties for each of the combination sampling rules.

20. The method of claim 16, wherein the material comprises semiconductor wafers.

21. The method of claim 16, wherein the combination rule associates the satisfaction of a first simple sampling rule with the satisfaction of a second simple sampling rule.

22. The method of claim 16, wherein the combination rule associates the violation of a first simple sampling rule with the satisfaction of a second simple sampling rule.

23. The method of claim 16, wherein the combination rule associates the violation of a first simple sampling rule with the violation of a second simple sampling rule.

24. The method of claim 16, further comprising fabricating subsequent material using a process controlled at least in part based on the measured characteristic.

25. The method of claim 16, further comprising measuring at least one characteristic of the selected material.

26. A system, comprising:

means for defining a plurality of simple sampling rules for selecting material for metrology, each simple sampling rule having an associated penalty incurred in response to a non-selection of material meeting the rule;

means for defining at least one combination sampling rule relating a subset of at least two simple sampling rules, the combination sampling rule having an associated penalty based on whether or not the material was selected for metrology according to each simple sampling rule in the subset;

means for assessing, for a given material selection, the penalties responsive to the simple sampling rules and the combination sampling rule;

means for selecting material for subsequent metrology based on the sampling rules and the assessed penalties; and means for outputting a sampling plan indicating the selected material.

* * * * *